United States Patent [19]
Hanazawa et al.

[11] Patent Number: 5,835,171
[45] Date of Patent: Nov. 10, 1998

[54] LIQUID CRYSTAL DISPLAY DEVICE COMPRISES A PLURALITY OF TFTS WITH A DESIRABLE CHANNEL LENGTH WHICH REDUCES THE RESISTANCE OF THE SCANNING LINES

[75] Inventors: Yasuyuki Hanazawa; Tomoko Kitazawa, both of Yokohama; Yoshihiro Asai; Katsuhiko Inada, both of Himeji; Tetsuya Iizuka, Chigasaki, all of Japan

[73] Assignee: Kabushiki Kaisha Toshiba, Kawasaki, Japan

[21] Appl. No.: 729,510

[22] Filed: Oct. 11, 1996

[30] Foreign Application Priority Data

Oct. 12, 1995 [JP] Japan .................................... 7-263830

[51] Int. Cl.⁶ ............................ G02F 1/136; G02F 1/1343
[52] U.S. Cl. ............................... 349/43; 349/46; 349/139; 349/143; 349/146; 349/148
[58] Field of Search ................................ 349/42, 43, 139, 349/143, 146, 148, 46

[56] References Cited

U.S. PATENT DOCUMENTS 5,508,765 4/1996 Nakagawa et al. .................... 349/42
5,517,341 5/1996 Kim et al. .............................. 349/139

FOREIGN PATENT DOCUMENTS

61-215520 9/1986 Japan .
6-242453 9/1994 Japan ..................................... 349/148

Primary Examiner—William L. Sikes
Assistant Examiner—Julie Ngo
Attorney, Agent, or Firm—Pillsbury Madison & Sutro LLP

[57] ABSTRACT

The present invention relates to the structure of an active matrix type liquid crystal display device in which a channel length of a thin film transistor without increasing resistance of a scanning line region to improve a switching characteristic. A slit is formed at the channel of the thin film transistor formed on the scanning line region. The slit is used as a mask and a pattern of a channel protection film for determining the channel of the thin film transistor is formed by exposure form a back surface of a substrate. According to this method, a desirable channel length can be obtained, and the scanning line region, facing to the channel through the slit, functions as an auxiliary region, so that the resistance of the scanning line region can be reduced.

8 Claims, 6 Drawing Sheets

LIQUID CRYSTAL DISPLAY DEVICE COMPRISES A PLURALITY OF TFTS WITH A DESIRABLE CHANNEL LENGTH WHICH REDUCES THE RESISTANCE OF THE SCANNING LINES

BACKGROUND OF THE INVENTION

1. Field of the Invention

The present invention relates to an active matrix type liquid crystal display device having a plurality of thin film transistor driver elements and liquid crystal member provided between an active matrix substrate and an opposite side substrate for displaying an image.

2. Description of the Related Art

An active matrix type liquid crystal display (LCD) device includes a plurality of thin film transistors (TFTs) formed at cross portions of matrices of scanning line (row) regions and signal line (column) regions, an active matrix plate (AM-plate), with pixel electrodes selectively driven by TFTs so as to display an image, a substrate opposite to the AM-plate, and liquid crystal material (liquid crystal layer) positioned between the AM-plate and the opposite substrate.

Each TFT is a field effect transistor (FET) having its gate connected to a scanning line region, drain connected to a signal line region, and source connected to a pixel electrode. A voltage applied to a channel area between the drain and source is controlled by the gate, so that a target pixel can be turned on (display state).

An area occupied by TFT (the size of the non-transmission area occupied in the size of the pixel obtained by dividing the total area by the number of pixels which the LCD device can display) does not contribute to the display (a non-transmission state). The effective (light transmission) region of the pixel may be enlarged by overlapping the scanning line region and TFT as seen in cross section. Specifically, a gate insulating film and a semiconductor layer are layered on the scanning line region, and the drain and the source are formed on the same surface and positioned at both ends of the scanning line region respectively. In other words, the drain and the source are formed opposite each other through the scanning line region. In this case, the width direction (length) of the scanning line region and the length of the channel are formed to be consistent with each other. According to the above-mentioned structure, the area of TFT occupied in the size of the pixel can be reduced because the scanning line region can be used directly as a gate.

Since a parasitic capacitor between the gate of TFT and the source has an unfavorable influence on the switching, the gate insulating film is formed by a self-aligning method. Specifically, the gate insulating film, the semiconductor layer, and the insulating film are sequentially layered on the gate. The gate insulating film is formed to be self-aligned with the gate by photo etching, exposure from the gate. As a result, the source is overlapped with the gate through the insulating film (in the direction of the thickness), so that the parasitic capacitor is reduced. In this case, the channel length is substantially conformed to that of the gate.

In accordance with the large capacitor (large screen) of recent display devices, an increase in a region resistance which is caused by an increase in the length of the scanning line. Specifically, if the resistance of the scanning line region exceeds a certain value, excessive time is required for TFT to respond to the gate voltage. As a result, a predetermined ON- current for TFT cannot be obtained. Thus, the length of the scanning line must be provided less than a fixed value to limit the resistance.

However, in the case of the self-aligning method, since the channel length is determined by the length of the scanning line, a predetermined switching speed cannot be obtained in the display device having a large area.

SUMMARY OF THE INVENTION

An object of the present invention is to provide a thin film transistor structure capable of executing a high-speed switching.

An another object of the present invention is to provide a structure for preventing a driving speed of a liquid crystal display device with a large screen from being reduced.

According to the present invention, there is provided an active matrix type liquid crystal display device comprising:

a plurality of scanning line regions and a plurality of signal line regions;

a plurality of thin film transistors, each of the thin film transistors formed at a crossing portion of each of the scanning line regions and each of the signal line regions such that a length direction of a channel is substantially parallel to a width direction of each of the scanning line regions;

a plurality of pixel capacitors, each of the pixel capacitors electrically connected to each of the thin film transistors; and a plurality of slits, each of the slits formed at a position corresponding to the channel side of the scanning line regions.

According to the present invention, by the exposure from the back surface using the slit, it is possible to manufacture the thin film transistor whose channel length is smaller than the width of the scanning line region.

Moreover, each of the scanning lines has an auxiliary region that includes a small width region, which substantially conforms to the length of the channel just below the channel in a direction to be parallel to the thickness of the channel, and a region including the auxilliary line portion for connecting both ends of the small width region to each other. As a result, a desirable length of the channel of the thin film transistor can be set, so that a desirable width of the scanning line can be obtained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

An embodiment of the present invention will be described with reference to the drawings.

Figure 1:
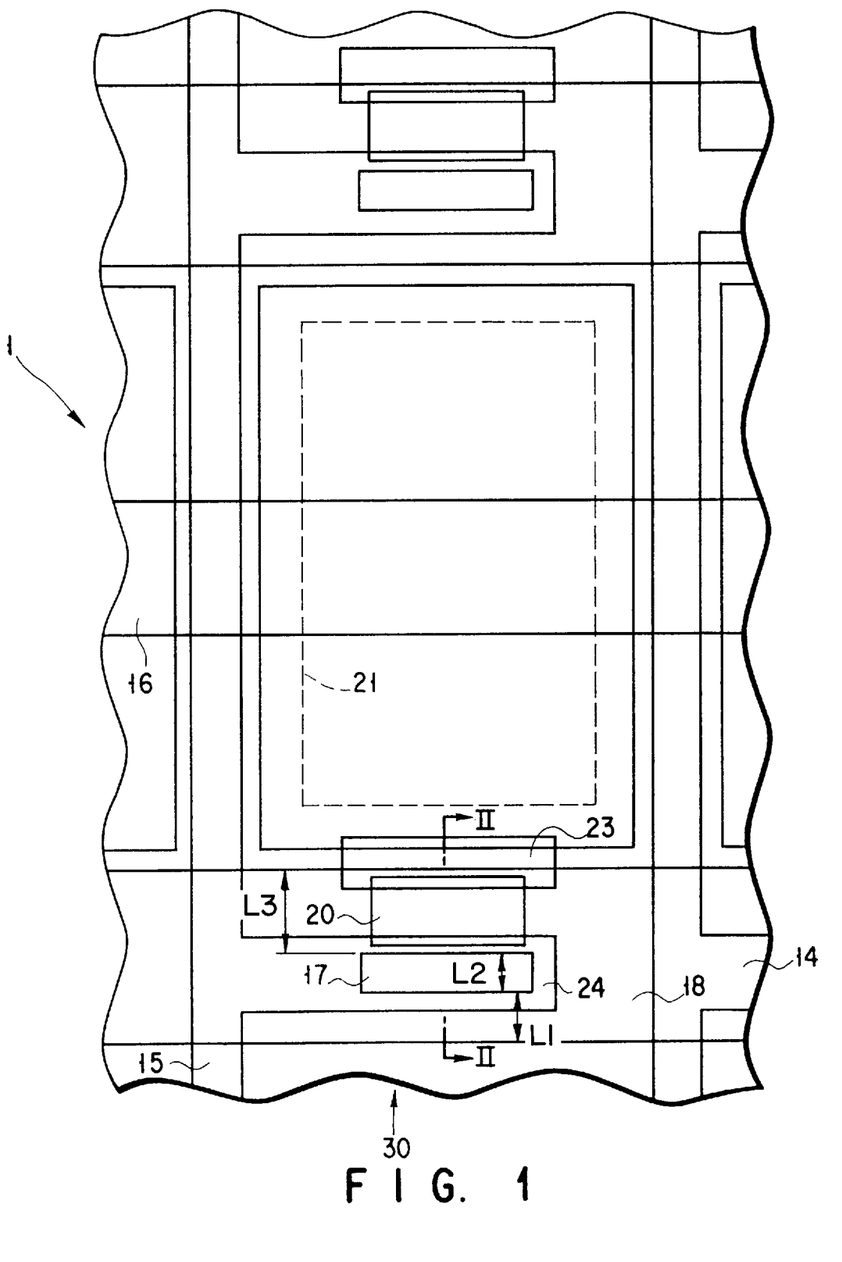
FIG. 1 is a partial schematic plain view showing a certain pixel of an active matrix type liquid crystal device (AM-LCD) to which an embodiment of the present invention is applied.
Figure 2:
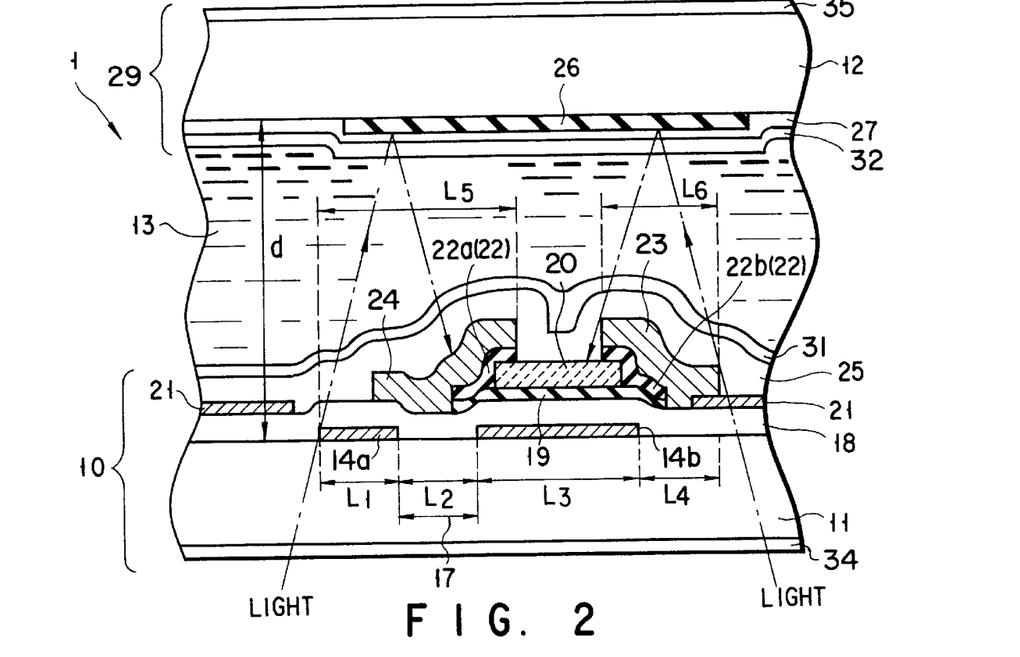
FIG. 2 is a partial schematic cross sectional view taken along a II—II of the LCD of FIG. 1.

FIGS. 1 and 2 are schematic views showing an active matrix type liquid crystal display (AM-LCD) device according to the embodiment of the present invention.

FIG. 1 is a partially schematic plain view showing a certain pixel of the liquid crystal device (LCD), and FIG. 2 is a cross sectional view taken along a II—II of the LCD of FIG. 1.

As shown in FIG. 2, an LCD panel 1 has an active matrix substrate 10 and an opposite substrate 29. The active matrix substrate 10 includes first substrate 11, a second substrate 12, which is opposite to the first substrate 11, and a liquid crystal material 13, which is positioned between the substrates 11 and 12.

On the substrate 11, a scanning line region 14, and a signal line region 15 are provided in a matrix form. An auxiliary (storage) capacitor line 16 (not shown in FIG. 2, see FIG. 1) is provided to be substantially parallel to the scanning line region 14. A non-conductive portion (to be described later), that is, a slit 17 is formed at a predetermined position of the scanning line region 14.

Each of the scanning line region 14 and the auxiliary capacitor line 16 is coated with a gate insulating film 18.

A semiconductor layer 19 and an insulating protection film 20 are sequentially formed on the gate insulating film 18. A pixel electrode 21 is formed on the gate insulating film 18 and an area which does not contact the semiconductor layer 19.

Low resistance layers 22a and 22b are formed at both ends of the semiconductor layer 19, which is parallel to the scanning line 14. The low resistance layers 22a and 22b are separated on the protection film 20. In this case, a low resistance material 22 is layered on the protection film 20. Then, the low resistance material 22 is formed to be shaped with metallic material to correspond to an electrode portion (source and drain) to be explained later.

On the low resistance layers 22a and 22b, the electrode portion for TFT, that is, the metal material functioning as the source and the drain is formed. On end portion of the metal material positioned on the low resistance layers 22a and 22b is overlapped with the pixel electrode 21. This metallic layer is formed to be shaped with the low resistance material 22 so as to be used as a source 23 and a drain 24. The drain 24 and the signal line region 15 are integrally formed in substantially the same process.

A passivation film 25 is formed in a whole area covering the source 23, the drain 24, the scanning line region 14, the signal line region 15, the auxiliary capacitor line 16, the pixel electrode 19 and the protection layer 20.

Thus, the active matrix substrate (array substrate) 10 is provided.

A light shielding film 26 and an ITO (indium tin oxide) 27, used as an opposite electrode, are formed at the side facing the first substrate 11 of the second substrate 12 opposite to the first substrate 11. In the whole area covering the light shielding film 26 and the opposite electrode 27, a passivation film (not shown) is formed, so that an opposite substrate 29 is provided.

The above-formed array substrate 10 and the opposite substrate 29 are opposed to each other to have a predetermined distance. Then, a predetermined amount of the liquid crystal material 13 is injected between the substrates 10 and 29; and drive elements (not shown) are provided for the liquid crystal display panel (LCD panel) 1.

Referring to FIG. 1, in the vicinity of the crossing section of the scanning line region 14 and the signal line region 15, a TFT (thin film transistor) 30 is formed of the scanning line region 14, the signal line region 15, the gate insulating film 18, the source 23, and the drain 24. The source 23 and the drain 24 are spaced to sandwich the insulating protection film 20 therebetween, and a channel region of TFT is formed between these electrodes.

Specifically, under the channel area, the scanning line region 14 functions as a gate for TFT 30. The source 23 is connected to the pixel electrode 21, and the drain 24 is connected to the signal line region 15.

Just under the drain 24 of the scanning line region 14, a slit 17 is formed. The scanning line region 14 is divided by the slit 17. A small width portion on the channel side 14b, seeing from the slit 17, functions as a gate for TFT. A portion 14a, facing the channel through the slit 17, functions as an auxiliary line portion.

Next, the following will explain a manufacturing method for an active matrix type liquid crystal display device.

First, the transparent insulating film (first substrate) 11 such as glass is coated with one of metal materials such as Ti, Cr, Al, Ta, Mo, W, Cu, etc., a layered film of these materials, or an alloy of these materials. Thereafter, the resultant layer is etched by photo etching process to have a predetermined shape, so that the scanning line 14 containing the slit 17 and the storage capacitor line (auxiliary capacitor line) 16 are formed.

Moreover, to cover these lines, for example, the gate insulating film 18, made of SiOx, is formed by plasma CVD.

The gate insulating film 18 is coated with hydrated amorphous silicon (a-Si:H) and an SiNx film, and the SiNx film is patterned to be a predetermined shape so as to obtain the protection film 20.

The pattern of the scanning line 14 is used as a mask, and the protection film 20 is patterned by self-aligning method. Specifically, the SiNx film is coated with a photo resist. Then, light is incident onto the photo resist from the back surface on which the scanning line region 14 is formed to exposure and develop the photo resist. As a result, the photo resist is formed to have substantially the same shape as the pattern of the scanning line region 14. The photo resist is used as a mask to etch the SiNx layer, so that the protection film 20 is formed. By light diffraction occurred at the exposure time, the photo resist and the protection film 20 can be made smaller than the width of the gate by 1 micro meter.

Next, an n type a-Si:H layer is formed by plasma CVD, and the n type a-Si:H layer and the a-Si:H layer are etched to be a predetermined shape by photo etching, respectively. As a result, the semiconductor layer 19 and ohmic contact layer (not shown) are formed.

The low resistance layers 22a and 22b are coated with, for example, an ITO film by spattering, and the resultant layer (ITO) is etched to be a predetermined shape by photo etching, so that the pixel electrode 21 is formed.

Sequentially, one of materials such as Ti, Cr, Al, Ta, Mo, W, Cu, etc., a layered film of these materials, or an alloy of these materials is formed on the low resistance layers 22a and 22b to have a predetermined thickness by spattering, and etched to be a predetermined shape by photo etching. As a result, the source 23, the drain 24, and the signal line region 15, which is combined with the source 23 and the drain 24, are formed. At this time, allowance for the shift of the pattern and accuracy of the line width is provided so that the slit 17 is completely covered with the drain 24.

Next, the passivation film 25, made of SiNx, is formed on the uppermost layer by plasma CVD.

On the transparent insulating substrate (second substrate) 12 such as glass, for example a Cr film is formed with a predetermined thickness by spattering. The resultant layer (Cr) is etched to be a predetermined shape by photo etching so as to form the light shielding film 26. Moreover, the opposite electrode 27, made of ITO, is formed on the light shielding film 26.

A polyimide film of a low-temperature cure type is printed and applied onto the entire surface of the electrode forming surface of each of the above-obtained array substrate 10 and the opposite substrate 29. By a rubbing process, a predetermined orientation is provided to the polyimide film, so that orientation films 31 and 32 are formed on the array substrate 10 and the opposite substrate 29, respectively.

Next, the array substrate 10 and the opposite substrate 29 are combined to be adhered to each other such that their orientations form an angle of 90° with each other. As a result, a liquid crystal cell 33 is formed.

Then, liquid crystal material is injected to the liquid crystal cell 33, polarizing plates 34 and 35 are attached onto the array substrate 10 and the outer surface of the opposite substrate 28. As a result, an active matrix type liquid crystal display device is completed.

According to the above-mentioned embodiment, in FIG. 2, the length L1 of the area of auxiliary wiring of the scanning line region 14 was set to 15 μm, the length L2 of the slit 17 was set to 10 μm. Also, the length L3 of the area as a gate was set to 14 μm, and the length L4 of the portion which is not overlapped with the gate of the source 23 was set to 11 μm. The gate area of the scanning line region 14 and the auxiliary wiring area were overlapped with the drain 24 by only a constant amount. The length L5, which is from the end of the channel side of the drain 24 to the end of the auxiliary line region was set to 29 μm. The length L6 of the source 23 was set to 15 μm. Moreover, the distance d between the first and second substrates in their internal surfaces was 5 μm.

The following will specifically explain the lengths L1 to L6.

If light is incident on the a-Si:H layer, which is used as the semiconductor layer 19 of TFT 30, a photo carrier is generated. As a result, the resistance value of the semiconductor layer 19 is reduced, an off-leak current of TFT 30 is generated. If an excessive off-leak current is generated, it is difficult to execute a normal display. To prevent the excessive off-leak current, an area where light is not incident on the semiconductor layer 19 is ensured. As a result, TFT 30 can be maintained in a high resistance state at the off time, and the off-leak current can be reduced.

More specifically, in TFT 30, the slit 17 is completely covered with the drain 24 to cut light, which is incident from the slit 17. Moreover, to prevent light, which is incident onto the liquid crystal cell from the drain 24 and reflected by the opposite substrate 29 (particularly light shielding layer 26), from entering the semiconductor layer 19, the lengths L1+L2+L3 and the lengths L3+L4 must be twice as long as the distance between both substrates. The length of the slit 17 may be provided to have a length, which is necessary for the exposure process in patterning the protection film 20. In consideration of the above points, the lengths L1 to L6 are set as mentioned above. In the LCD panel 1 having the above-mentioned characteristics, the off-leak current of TFT 30 is reduced to a certain extent that can be ignored in driving the LCD panel 1.

The area 14a which is opposite to the gate area 14b of the scanning line region 14 through the slit 17, functions as an auxiliary region. Due to this, in TFT 30, increase in resistance of the scanning line region 14, which is caused by providing the gate area having the small length, can be substantially ignored.

The importance of the above advantage is increased as the display density becomes high. In other words, the smaller the total area of one pixel becomes, the larger the percentage of the area of TFT 30 occupied in the total area becomes.

Specifically, the percentage of the gate area occupied in the scanning line region 14 is increased. Due to this, in a case where no auxiliary line region is provided, the length of the gate area is reduced and the resistance of the scanning line region 14 is increased. Particularly, in the liquid crystal display device whose diagonal is about 10 inches, the use of the auxiliary line region is extremely useful when the percentage of the length of the gate area, which is occupied in the length of the scanning line in one pixel area, is 20 per cent or more. In this case, the display performance of the liquid crystal display device is not influenced by the slow response to the gate voltage.

In the above-explained embodiment, the slit 17 was formed on the drain 24, seen from the channel. However, the slit 17 may be formed on the source 23. In this case, the source 23 comes in contact with the semiconductor layer 19 over the auxiliary line region of the scanning line region 14 and the slit 17. Therefore, as compared with the case in which the slit 17 is formed on the drain, the overlapping area of the source 23 and the scanning line region 14 is increased by the portion of the auxiliary line region.

The overlapping area functions as a parasitic capacitor Cgs between the gate of TFT 30 and the source.

It is known that the size of the parasitic capacitor Cgs influences the display performance of the liquid crystal display device. Specifically, when a display signal is written to the pixel electrode 21 (pixel is turned on), TFT 30 is set to a conductive state, and the voltage applied to the signal line region 15 is supplied to the pixel electrode 21 from TFT 30. Then, as soon as the voltage supply is ended and TFT 30 is set to a non-conductive state, the signal written to the pixel electrode 21 is distributed to the parasitic capacitor Cgs.

The voltage of the pixel electrode 21 is reduced from the display signal first written to the electrode 21. The reduction of the voltage depends on the capacitor value of Cgs and the level of the voltage supplied to the pixel electrode 21. For this reason, it is difficult to uniformly compensate for the display signal first written to the electrode 21. As a result, if the capacitor value of Cgs is excessively increased, there is a case in which time for maintaining the onstate of TFT 30 differs depending on each pixel and the normal display operation cannot be executed. In view of the point that the capacitor value of Cgs is set to be as small as possible, the slit 17 is preferably formed on the drain 24.

The following will explain various modifications.

Figure 3:
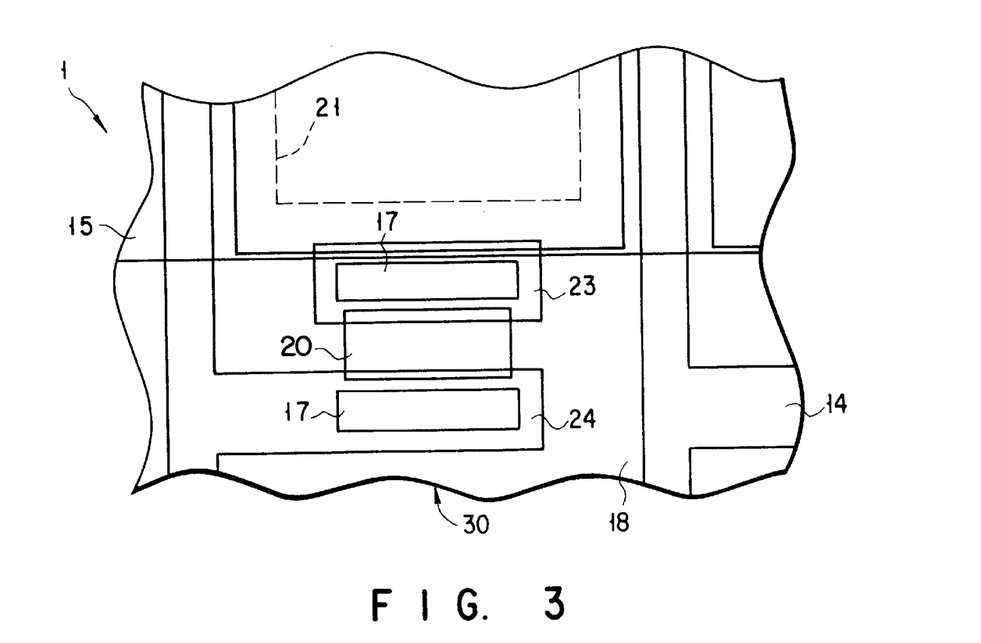
FIG. 3 is a partial schematic plain view showing another example of thin film transistor (TFT) of the LCD device of FIG. 1.

As shown in FIG. 3, TFT 30 is provided at the central portion of the scanning line region 14 in a width direction. The slit 17 is formed at both sides of the channel. Then, the source 23 and the drain 24 may be formed to cover each of the slits 17 formed at both sides of the channel. In this case, the scanning line region 14 of the area between both slits functions as a gate. Then, the scanning line region 14, facing to the area through the slit, functions as the auxiliary line region.

Figure 4:
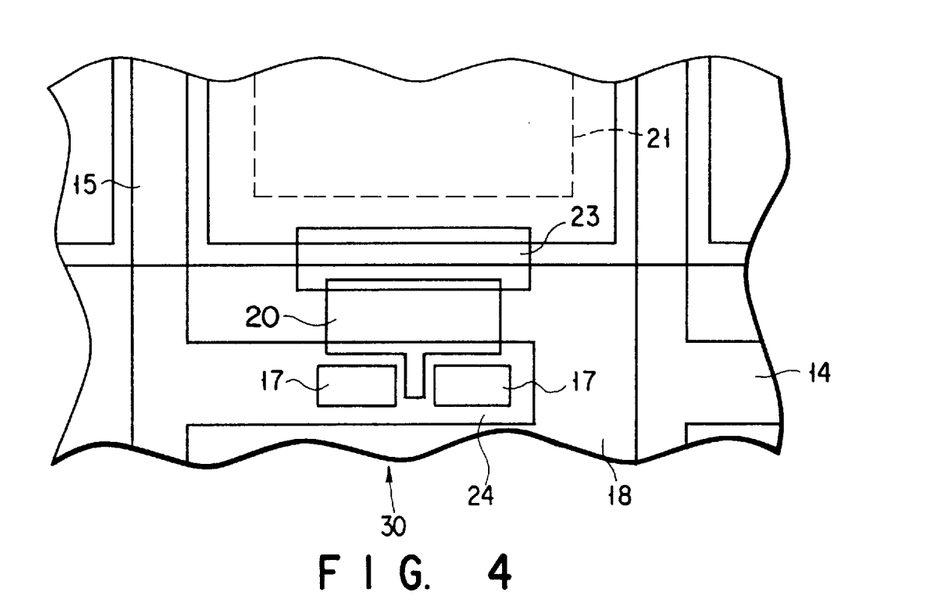
FIG. 4 is a partial schematic plain view showing further another example of TFT of the LCD device of FIG. 1.

As shown in FIG. 4, a contact bridge may be formed at an intermediate portion of each slit 17 so as to connect the gate area to the auxiliary line region. Even if the auxiliary line region is electrically disconnected, a current path can be ensured by the bridge, so that the resistance value of the scanning line can be reduced. For forming the bridge, the protection film 20 is shaped to include a shadow of the bridge by self-aligning. As a result, in the area including the shadow of the bridge, the drain 24 does not come in contact with the semiconductor layer 19. Moreover, the drain 24 does not contribute to the channel length. As a result, the length of the bridge is set to a certain extent that no influence is exerted on the switching characteristic, which is defined by the channel length and which is necessary for TFT 30.

Figure 5:
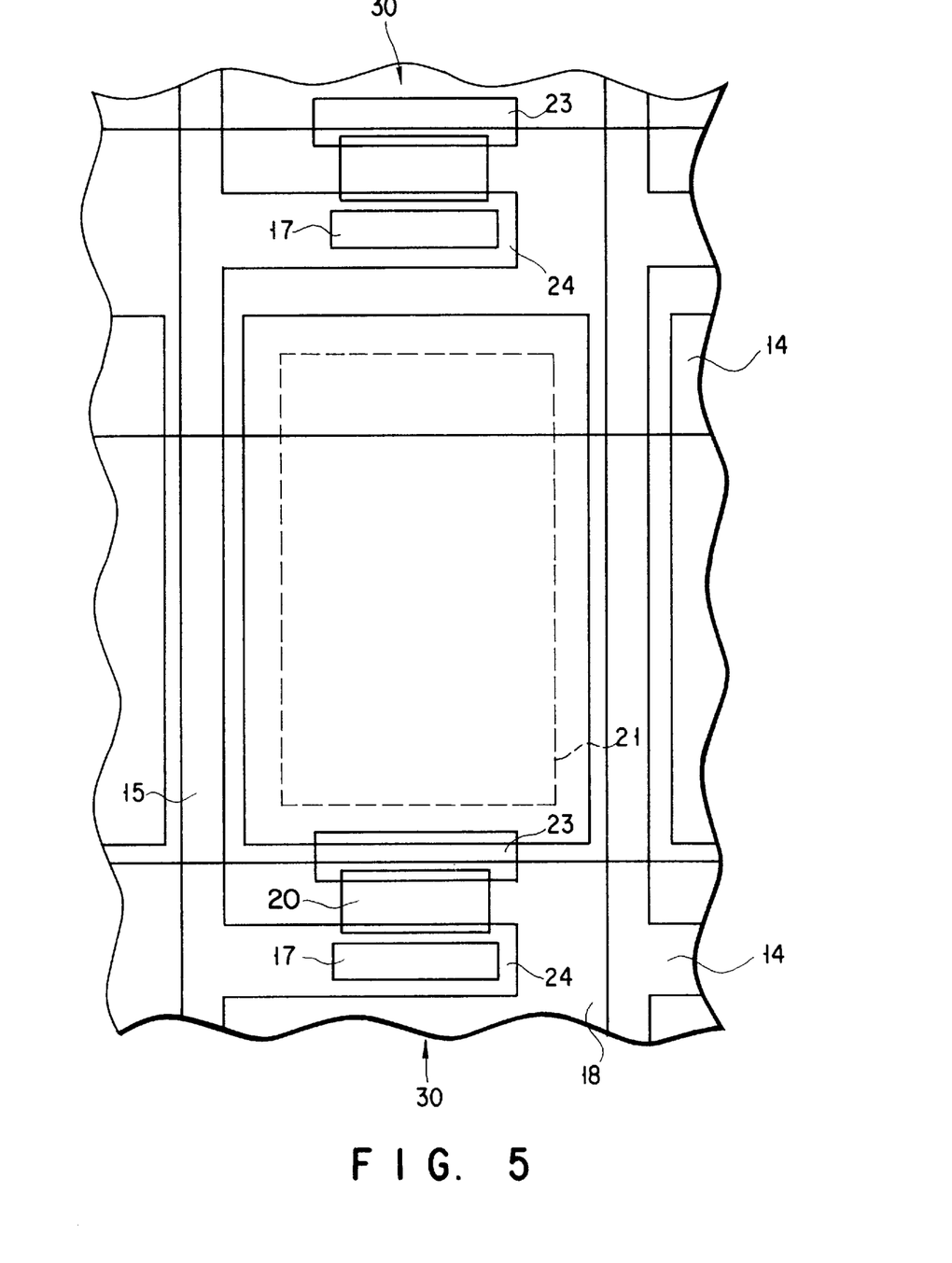
FIG. 5 is a partial schematic plain view showing a certain pixel of a modification of the LCD device of FIG. 1.

FIG. 5 shows a structure in which a part of the scanning line region 14 is used as the storage (auxiliary) capacitor line 16. Specifically, the scanning line region 14 and the end portion of the pixel electrode 21 is overlapped with each other, so that the storage capacitor Cs is formed. As a result, the scanning line region 14 can be also used as the storage capacitor line 16, so that the aperture rate can be increased.

Figure 6:
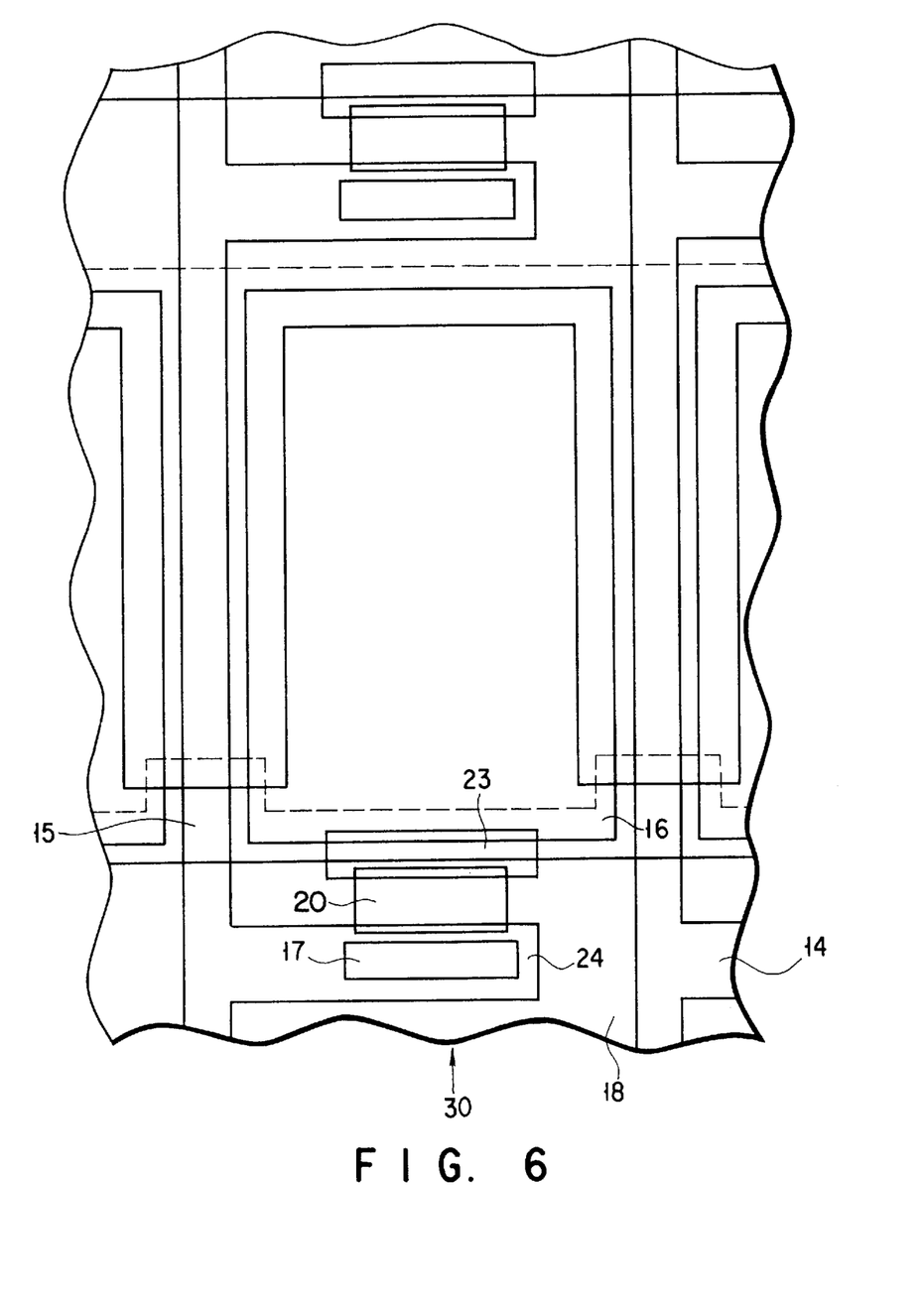
FIG. 6 is a partial schematic plain view showing a certain pixel of another modification of the LCD device of FIG. 1.

FIG. 6 shows an example in which the scanning line region 14 and the storage capacitor line 16 are combined with each other to cover a gap between the signal line region 15 and the pixel electrode 21 thereby shielding light, which is incident from the gap. As a result, a leakage of light from the adjacent pixels can be prevented so as to improve a display contrast.

Figure 7:
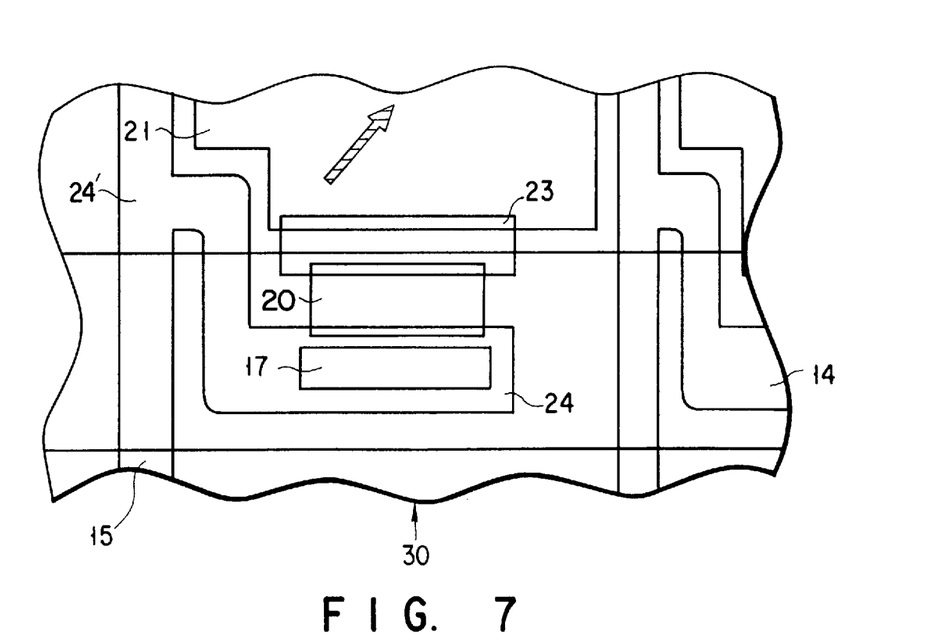
FIG. 7 is a partial schematic plain view showing a certain pixel of further another modification of the LCD device of FIG. 1.

FIG. 7 shows an example in which an electrode 24' (drawing area) branched from the signal line region. 15 is drawn to the outer area of the scanning line region 14 so as to be connected to the drain 24. In a case where the operation failure of TFT 30 occurs, the drawing area 24' is irradiated with a laser beam from the back surface of the first substrate so as to disconnect the drain 24 and the signal line region 15. As a result, the defective pixel can be permanently turned off.

The drawing area 24' may be drawn from the source 23 with respect to the scanning line region 14. Also, the drawing area 24' may be drawn to the pixel side adjacent to the opposite side.

The drawing area 24' is provided in the vicinity of the pixel electrode 21. Due to this, if the orientation of the crystal liquid is disordered by influence of an electric field between the drawing area and the pixel electrode, the following point can be considered.

Specifically, the orientation of the liquid crystal on the display pixel electrode close to the drawing area is disordered so as to exert influence upon the display. This influence can be observed as a phenomenon in which light is leaked since the orientation of the liquid crystal differs at the adjacent areas.

As a result of reviewing the above point, it was understood that the display was not influenced by the above phenomenon at all when the rubbing direction of the orientation film was set to the diagonal of the display pixel electrode from the drawing area as shown by an arrow of the figure. The reason can be considered as follows.

Specifically, since liquid crystal molecules are tilted to the final end of the rubbed orientation film in advance, the display is not easily subjected to the influence of the electric field between the drain 24 and the display pixel electrode.

Figure 8:
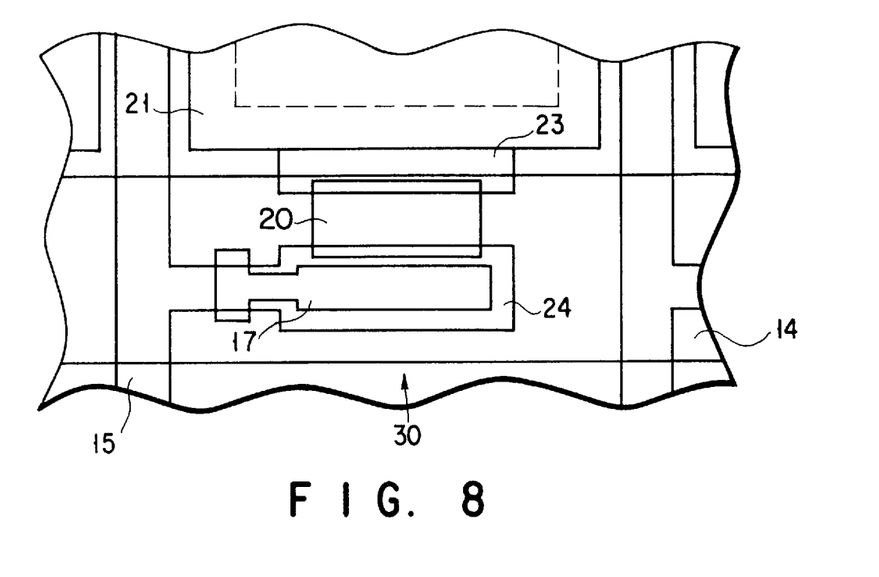
FIG. 8 is a partial schematic plain view showing a certain pixel of another modification of the LCD device of FIG. 1.

The influence of the leakage of light exerting upon TFT 30 is controlled by the structure of TFT 30 or the driving conditions of the liquid crystal display device. For this reason, unlike the example of FIG. 1, it is unnecessary to completely cover the slit 17 with the drain 24. For example, as shown in FIG. 8, the slit may be extended to the signal line region such that a part of the drain 24 is exposed from the scanning line, seeing from the back surface side of the substrate 11. In this case, even if the defective pixel (operation failure) is generated, the exposed portion of the drain 24 may be irradiated with the laser beam such that the defective pixel is turned off. In the structure of FIG. 8, there is a possibility that the leakage of light will be increased. In this case, the slit may be formed on the drain exposed portion and the channel exposed portion, separately. However, in this case, since a technique for forming fine holes is required, an appropriate manufacturing method is desired. In the structure of FIG. 7, since there is no possibility that the leakage of light will be increased, patterning can be relatively easily performed.

Figure 9:
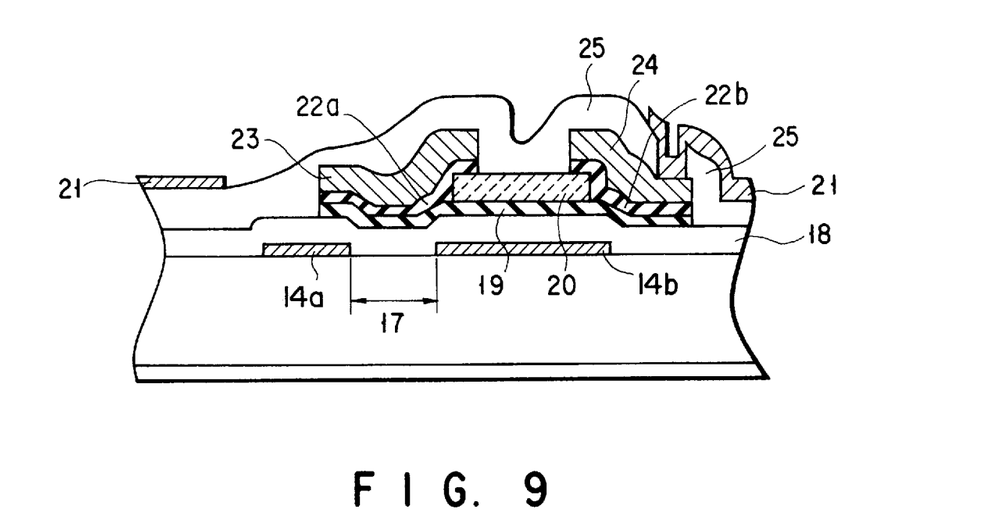
FIG. 9 is a partial schematic plain view showing a certain pixel of another modification of the LCD device of FIG. 1.

As shown in FIG. 9, the source and the drain, and the display pixel electrode may be layered in a reverse order such that the pixel electrode is formed on the uppermost layer of the source region of TFT 30. In the structure of FIG. 9, the source, the drain, the signal line combined with the drain, and the semiconductor layer under the signal line region are patterned by use of the same photomask, so that the number of steps can be reduced.

The shape of the slit is not limited to the shape described in the above-mentioned embodiment. The slit may be arbitrarily shaped such as an ellipse.

As explained in the above embodiments, the slit or the auxiliary line region is formed on the scanning line, so that the length of the operation region can be set regardless of the length of the channel region. As a result, both the desirable transistor characteristic and the reduction of the resistance of the operation region can be obtained. Thereby, the display performance of the active matrix type display device can be largely improved.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An active matrix type liquid crystal display device comprising:
    a plurality of scanning line regions and a plurality of signal line regions;
    a plurality of thin film transistors, each of said thin film transistors formed on a crossing portion of each of said scanning line regions and each of said signal line regions such that a length direction of a channel is substantially parallel to a width direction of each of said scanning line regions; and a plurality of pixel capacitors, each of said pixel capacitors electrically connected to each of said thin film transistors wherein a scanning line region has a plurality of slits therein, each of said slits formed at a side position of said channel of said scanning line regions.

2. The device according to claim 1, wherein each of said thin film transistors has a drain and a source, said drain of each of said thin film transistors is connected to each of said signal line regions, and said source of each of said thin film transistors is connected to each of said pixel capacitors, and each of said slit is formed on at least one of said drain and source sides.

3. The device according to claim 1, wherein each of said slits has a plurality of holes formed along the width direction of said channel.

4. The device according to claim 1, wherein each of said pixel capacitors has an electrode to provide auxiliary capacitance at a portion where said electrode and each of said scanning line regions are overlapped with each other.

5. The device according to claim 2, wherein the drain or the source having said slit includes light shielding metal to cover said slit to shield light.

6. The device according to claim 2, wherein said slit is formed on only the drain side.

7. The device according to claim 6, wherein said drain has a portion which is not overlapped with said scanning line region.

8. The device according to claim 6, wherein a protection insulating film is formed on said channel, and an end portion of said protection insulating film is formed to be self-aligned with the end portion of said scanning line region of the source side.

* * * * *